(12) United States Patent
Ivakitch et al.

(10) Patent No.: US 8,827,637 B2
(45) Date of Patent: Sep. 9, 2014

(54) SEAL ARRANGEMENT FOR GAS TURBINE ENGINES

(75) Inventors: Richard Ivakitch, Toronto (CA); Andreas Eleftheriou, Woodbridge (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 70 days.

(21) Appl. No.: 13/428,360

(22) Filed: Mar. 23, 2012

(65) Prior Publication Data

US 2013/0249172 A1 Sep. 26, 2013

(51) Int. Cl.
*F16J 15/02* (2006.01)
(52) U.S. Cl.
USPC .................. 415/170.1; 277/543; 277/544
(58) Field of Classification Search
CPC .... F01D 11/003; F01D 11/005; F01D 25/183
USPC ............... 277/500, 543, 544, 630, 637, 640;
415/170.1, 214.1, 229–231
See application file for complete search history.

(56) References Cited

U.S. PATENT DOCUMENTS

| | | | |
|---|---|---|---|
| 3,931,978 A | 1/1976 | Grimston | |
| 4,552,509 A | 11/1985 | Schweikl et al. | |
| 4,669,959 A | 6/1987 | Kalogeros | |
| 4,708,370 A | 11/1987 | Todd | |
| 4,767,267 A * | 8/1988 | Salt et al. | ................... 415/173.7 |
| 5,236,302 A | 8/1993 | Weisgerber et al. | |
| 5,320,488 A | 6/1994 | Meade et al. | |
| 5,332,358 A | 7/1994 | Hemmelgarn et al. | |
| 5,333,993 A | 8/1994 | Stueber et al. | |
| 5,338,154 A | 8/1994 | Meade et al. | |
| 5,472,313 A | 12/1995 | Quinones et al. | |
| 5,816,776 A | 10/1998 | Chambon et al. | |
| 6,139,264 A | 10/2000 | Schilling | |
| 6,290,537 B1 | 9/2001 | Sommer | |
| 6,695,319 B1 | 2/2004 | Anota et al. | |
| 7,198,303 B2 | 4/2007 | Brophy, III et al. | |
| 7,854,586 B2 * | 12/2010 | Major et al. | ................... 415/160 |
| 2009/0136348 A1 * | 5/2009 | Bonniere et al. | ............... 416/190 |
| 2012/0251313 A1 * | 10/2012 | Eleftheriou et al. | ........ 415/209.3 |

* cited by examiner

*Primary Examiner* — Kristina Fulton
*Assistant Examiner* — Thomas Neubauer
(74) *Attorney, Agent, or Firm* — Norton Rose Fulbright Canada LLP

(57) ABSTRACT

A seal arrangement for a gas turbine engine comprises a seal support having a hub portion and a peripheral rim portion. A seal member is mounted to a radially inner surface of the hub portion. A first set of circumferentially spaced-apart channel segments project from the peripheral rim portion of the seal support. A second set of circumferentially spaced-apart channel segments projects from a mating stationary structure of the gas turbine engine. The first and second sets of circumferentially spaced-apart channel segments circumferentially may be aligned to complementary form a circumferentially extending channel. A retaining ring may be mounted in the circumferentially extending channel for retaining the seal support on the mating stationary structure of the engine. The seal support may be provided with a diaphragm to provide flexibly between the seal member and the point of attachment of the seal support to the mating structure of the engine.

7 Claims, 4 Drawing Sheets

SEAL ARRANGEMENT FOR GAS TURBINE ENGINES

TECHNICAL FIELD

The application relates generally to gas turbine engines and, more particularly, to a seal arrangement for such engines.

BACKGROUND OF THE ART

Typically, carbon seals are retained by bolting in place via a flange, or stacking them and axially locking them against a retaining ring. Depending on the engine architecture, access to the retaining ring at the front of the carbon seals may be difficult. Also stresses/loads exerted on the seals are directly transferred to the retaining rings.

SUMMARY

In one aspect, there is provided a seal arrangement for a gas turbine engine, the seal arrangement comprising: a seal support adapted to be mounted about an axis, the seal support having an inner cylindrical part and a peripheral rim portion, at least one seal member mounted to a radially inner surface of the inner cylindrical part of the seal support, a first set of circumferentially spaced-apart channel segments projecting from a radially outer surface of said peripheral rim portion of the seal support, a second set of circumferentially spaced-apart channel segments projecting from a mating stationary structure of the gas turbine engine, the first and second sets of circumferentially spaced-apart channel segments circumferentially lining up to complementary form a circumferentially extending segmented channel, and at least one retaining ring mounted in the circumferentially extending segmented channel.

In a second aspect, there is provided a seal arrangement for a gas turbine engine, the seal arrangement comprising: a seal support adapted to be mounted about an axis, the seal support having an inner cylindrical part and a diaphragm extending radially outwardly from said inner cylindrical part, at least one seal member mounted to a radially inner surface of said inner cylindrical part of the seal support, and a first attachment structure projecting from a radially outer peripheral portion of the diaphragm for mating engagement with a corresponding second attachment structure of a stationary housing structure of the gas turbine engine, the diaphragm at least partly flexibly isolating the first and second attachment structures from the at least one seal member.

DESCRIPTION OF THE DRAWINGS

Reference is now made to the accompanying figures, in which.

DETAILED DESCRIPTION OF THE PREFERRED EMBODIMENTS

Figure 1:
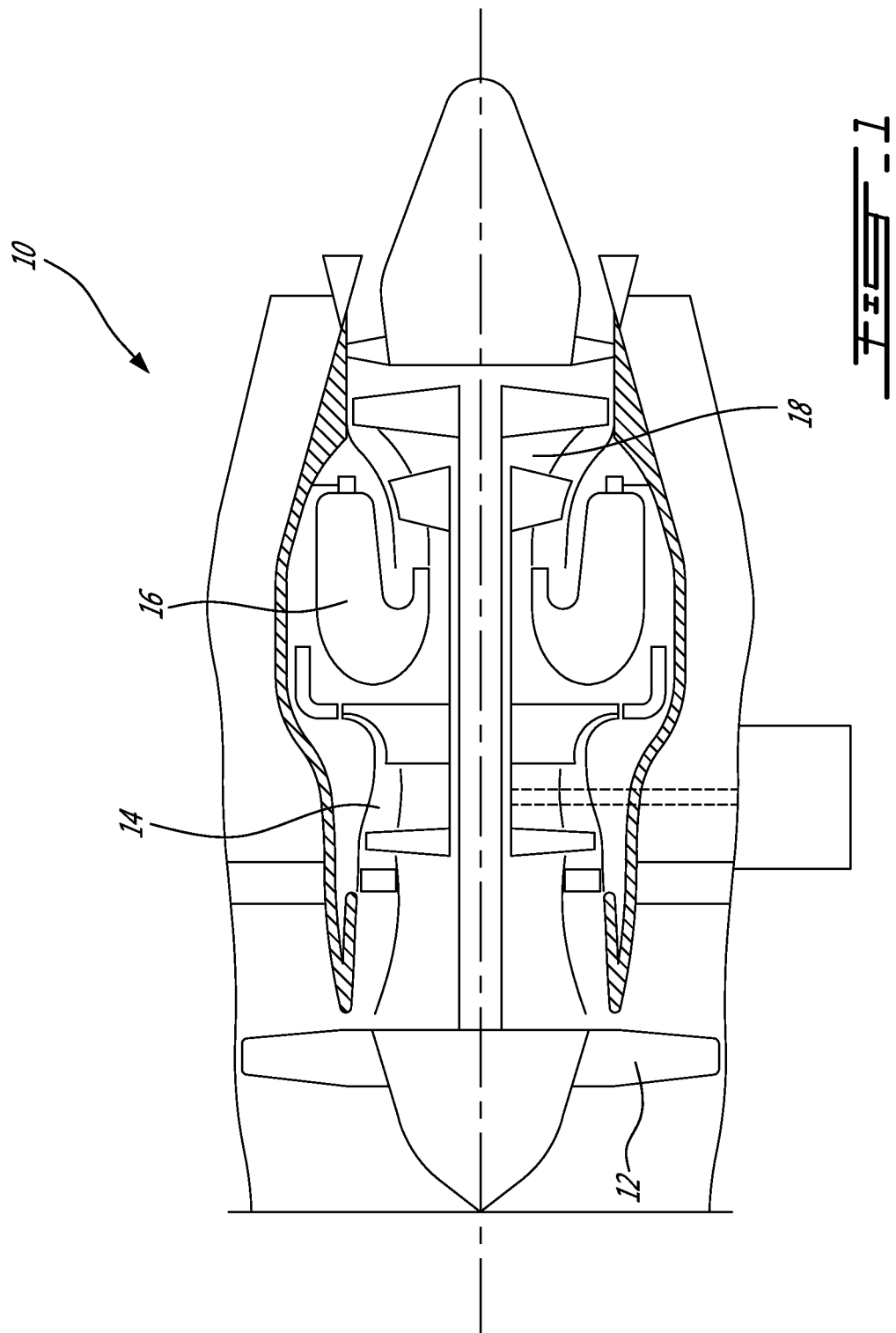
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
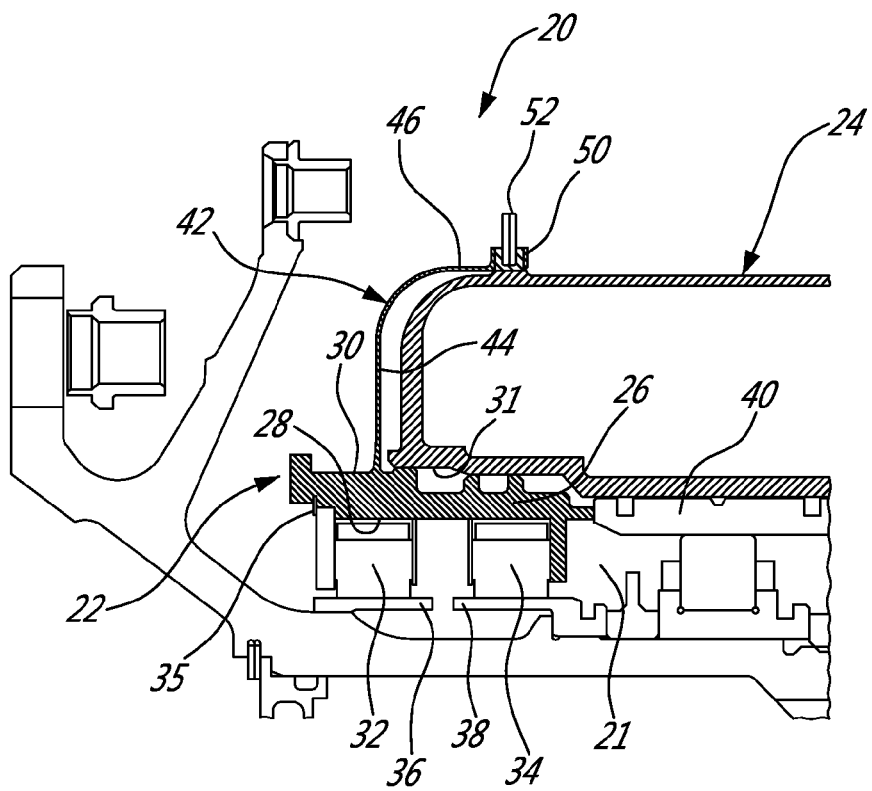
FIG. 2 is a cross-sectional view of a carbon seal mounted to a housing of the engine shown in FIG. 1.
Figure 3:
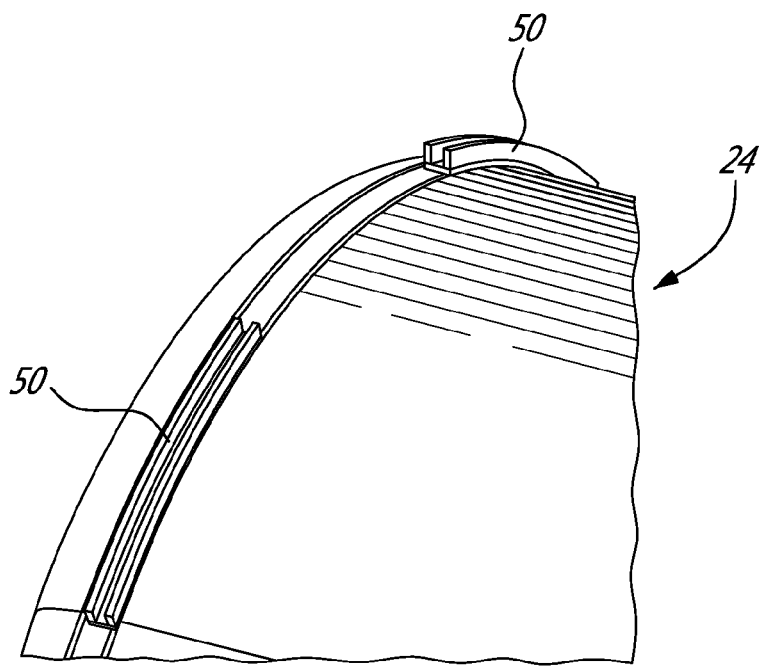
FIG. 3 is an enlarged isometric view of the housing and illustrating fixing features for cooperating with corresponding fixing features of the seal support of the carbon seal.

FIG. 2 illustrates an example of a seal arrangement 20 that may be used in the engine 10. For instance, the seal arrangement 20 may be provided in the form of a carbon seal for sealing a bearing cavity 21 or other engine areas which requires sealing. The seal arrangement 20 comprises a stationary annular seal support 22 (also see FIG. 4) adapted to be concentrically mounted about an axis of the engine 10. The seal support 22 may be mounted to a stationary tubular housing 24 (also see FIG. 3) of the engine 10. As will be seen herein after, the seal support 22 and the housing 24 have complementary fixing features to allow them to be readily attached together from outside of the housing 24.

Figure 4:
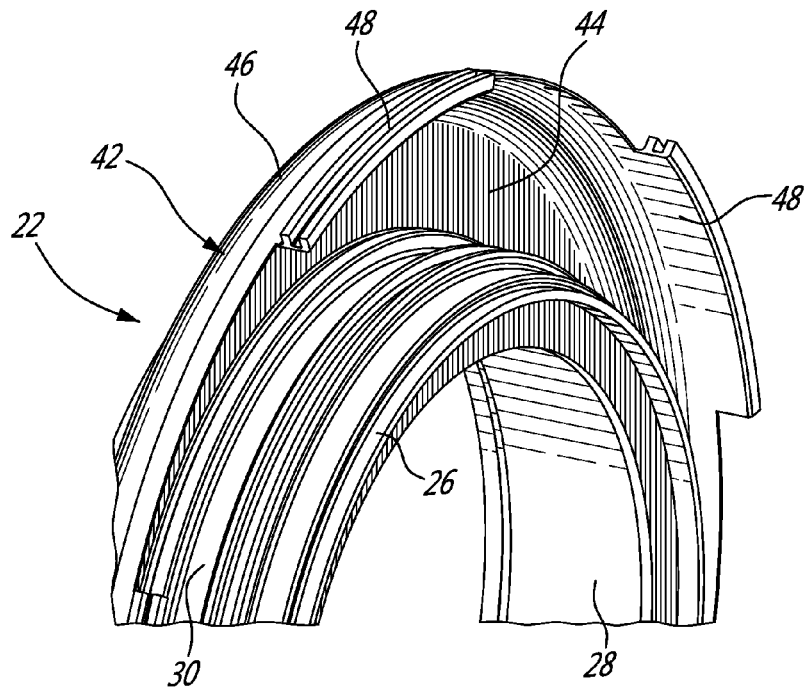
FIG. 4 is an enlarged isometric view of the seal support.
Figure 6:
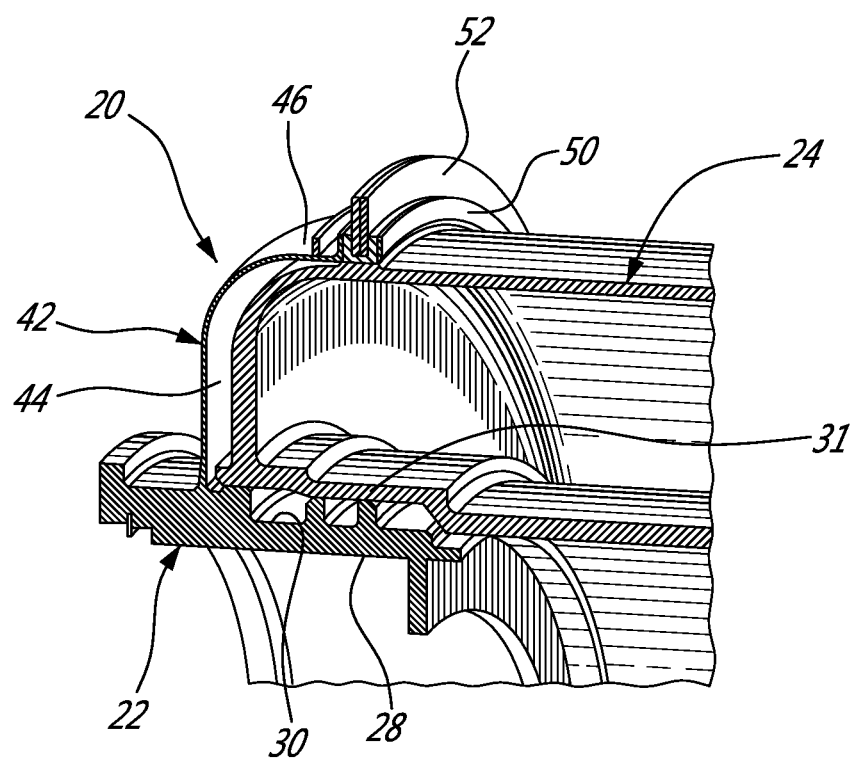
FIG. 6 is an enlarged isometric view, partly in section, illustrating the mounting details of the seal support and the mating engine housing.

Referring concurrently to FIGS. 2, 4 and 6, it can be appreciated that the seal support 22 has an inner cylindrical part 26 having a radially inner circumferentially extending surface 28 and an opposed radially outer circumferentially extending surface 30. As best shown in FIGS. 2 and 6, the outer surface 30 is configured to be axially received in a fit manner in a corresponding entry portion 31 of the housing 24. The cylindrical part 26 may be cast or machined from a solid block of metallic material. According to the embodiment illustrated in FIG. 2, two axially spaced-apart carbon seal rings 32 and 34 are mounted to the radially inner surface 28 of the cylindrical part 26. It is understood that the number of sealing rings carried by the seal support 22 may vary depending on the intended application. C-shaped clips 35 or other suitable retaining devices may be used to axially lock seal rings 32 and 34 on the radially inner surface 28 of the cylindrical part 26 of the seal support 22. In the illustrated example, the seal rings 32 and 34 are in sealing engagement with corresponding sealing surfaces 36 and 38 of a bearing housing 40.

The seal support 22 has a diaphragm 42 extending radially outwardly from the radially outer surface of the cylindrical part 26. The diaphragm 42 has a radially extending web portion 44 projecting from a forward end portion of the inner cylindrical part 26 and a peripheral rim portion 46 extending axially rearwardly from a radially outer end of the web portion 44. A relatively smooth bent is defined between the web portion 44 and the peripheral rim portion 46. The diaphragm 42, including the web portion 44 and the peripheral rim portion 46, may be made of sheet metal. Other suitable thin plate-like member providing more or less flexibility could be used as well to form the diaphragm 42. The radially inner end of the web portion 44 of the diaphragm may be integrally joined to the cylindrical part 26 by any suitable means. For instance, the web portion 44 may be welded to the cylindrical part 26.

As shown in FIG. 4, attachment or fixing features 48 are provided at a distal end of the peripheral rim portion 46 for allowing mounting of the seal support 22 to the engine housing 24. The diaphragm 42 flexibly joins the fixing features 48 to the cylindrical part 26. In this way, the mounting location of the seal support 22 may be isolated to prevent additional stress/deflection to the seals 32 and 34 it is holding. The flexibility of the provided by diaphragm 42 contributes to isolate the movement of the seal from the bearing housing 40.

Figure 5:
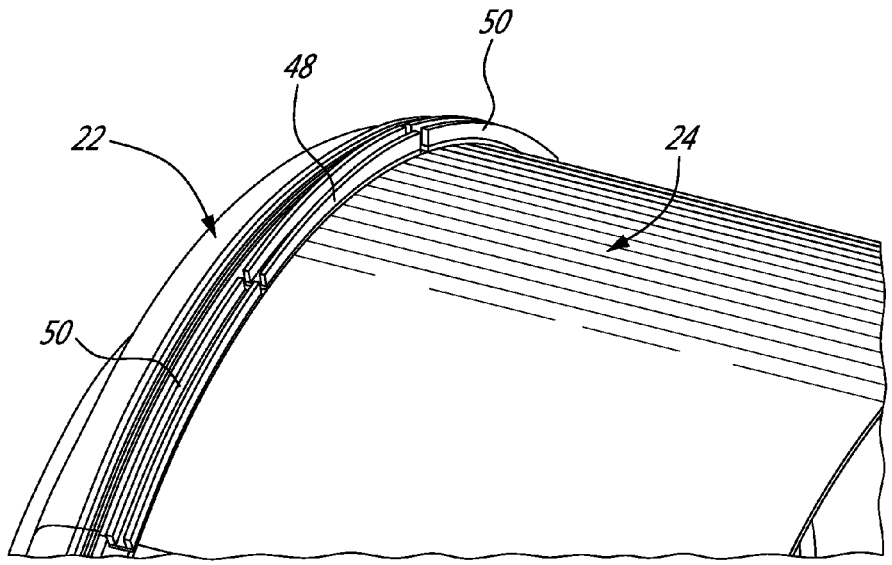
FIG. 5 is an enlarged isometric view illustrating the installation of the seal support on the housing.

As best shown in FIG. 4, the fixing features 48 may take the form of radially outwardly open channel segments uniformly distributed along the circumference of the rim portion 46 of the seal support 22. As can be appreciated from FIGS. 3 and 5, corresponding or matching channel segments 50 are provided on the radially outer surface of the housing 24. The channel segments 48 and 50 are adapted when aligned with each other to complementary form a circumferentially extending channel for receiving at least one retaining ring 52 (FIGS. 2 and 6). As shown in FIG. 5, the channel segments 48 and 50 may be lined up by fitting the peripheral rim 46 of the seal support 22 over the forward end of the housing 24 with each channel segment of the seal support 22 received between two adjacent channel segments 50 of the housing 24. Then, the retaining ring 52 may be installed in the segmented channel formed by the channels segments of the seal support 22 and the housing 24. The complementary channel segments may be machined or otherwise suitably form on the seal support 22 and the engine housing 24. Also, it is understood that other types of lugs or interlocking features such as dog/slot engaging features could be used in place of the illustrated retaining ring channel receiving features.

From FIG. 2, it can be appreciated that the provision of the complementary fixing features on the outer surface of the seal support 22 and of the housing 24 at an axially overlapping location thereof provides for easy access to the retaining ring 52. In this way, the seal support 22 can be readily mounted to and removed from the housing 24. Indeed, as can be appreciated from FIG. 2, the retaining ring 52 is easily visible and accessible by hands.

The above description is meant to be exemplary only, and one skilled in the art will recognize that changes may be made to the embodiments described without departing from the scope of the invention disclosed. For example, it is understood that the seal support may be installed on various stationary structures of the engine. Also, the seal retaining arrangement is not limited to carbon seal. It could be integrated to various types of seals. Still other modifications which fall within the scope of the present invention will be apparent to those skilled in the art, in light of a review of this disclosure, and such modifications are intended to fall within the appended claims.

What is claimed is:

1. A seal arrangement for a gas turbine engine, the seal arrangement comprising: a stationary housing structure having an axis, a seal support mounted to the stationary housing structure, the seal support having an inner cylindrical part and a diaphragm extending radially outwardly from said inner cylindrical part, the inner cylindrical part projecting axially within the stationary housing structure, at least one seal member mounted to a radially inner surface of said inner cylindrical part of the seal support, and a first set of circumferentially spaced-apart channel segments projecting from a radially outer peripheral portion of the diaphragm for mating engagement with a corresponding second set of circumferentially spaced-apart channel segments provided on a radially outer surface of the stationary housing structure, the diaphragm at least partly flexibly isolating the first and second sets of channel segments from the at least one seal member, when axially aligned, the first and second set of circumferentially spaced-apart channel segments cooperating to define a circumferentially extending channel, and wherein at least one retaining ring is engaged in the circumferentially extending channel to axially retain the seal support on the stationary housing structure of the gas turbine engine.

2. The seal arrangement defined in claim 1, wherein the diaphragm is provided in the form of a sheet metal member joined to a radially outer surface of the inner cylindrical part.

3. The seal arrangement defined in claim 1, wherein the diaphragm is provided in the form of a flexible plate having a web portion extending radially outwardly from a radially outer surface of the hub portion and a peripheral rim portion extending axially from a radially outer end portion of the web portion, and wherein the first set of channel segments project radially outwardly from a distal end portion of said peripheral rim portion.

4. The seal arrangement defined in claim 1, wherein the first and second sets of channel segments cooperate together to form a radially outwardly open channel for receiving the at least one retaining ring.

5. The seal arrangement defined in claim 1, wherein the at least one seal member comprises a carbon seal ring.

6. The seal arrangement defined in claim 1, wherein the diaphragm has an end portion which extends axially around a corresponding end of the stationary housing structure of the gas turbine engine.

7. The seal arrangement defined in claim 1, wherein the first and second sets of channel segments are accessible from outside of the stationary housing structure of the gas turbine engine.

* * * * *